US008782766B1

(12) United States Patent
Metke et al.

(10) Patent No.: US 8,782,766 B1
(45) Date of Patent: Jul. 15, 2014

(54) METHOD AND APPARATUS FOR SINGLE SIGN-ON COLLABORATION AMONG MOBILE DEVICES

(71) Applicant: Motorola Solutions, Inc., Schaumburg, IL (US)

(72) Inventors: Anthony R. Metke, Naperville, IL (US); Katrin Reitsma, Chicago, IL (US); Adam C. Lewis, Buffalo Grove, IL (US); George Popovich, Palatine, IL (US); Steven D. Upp, Bartlett, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 42 days.

(21) Appl. No.: 13/728,422

(22) Filed: Dec. 27, 2012

(51) Int. Cl.
  G06F 7/04 (2006.01)
  H04L 29/06 (2006.01)
  H04W 12/06 (2009.01)
  G06F 21/41 (2013.01)
  G06F 17/30 (2006.01)

(52) U.S. Cl.
  CPC ........... *H04L 63/0884* (2013.01); *H04W 12/06* (2013.01); *G06F 21/41* (2013.01); *H04L 63/0815* (2013.01)
  USPC ....................................... 726/8; 726/7; 726/9

(58) Field of Classification Search
  CPC .. H04L 63/0884; H04L 63/0815; G06F 21/41
  USPC .................................................... 726/7, 8, 9
  See application file for complete search history.

(56) References Cited

U.S. PATENT DOCUMENTS

| 6,421,768 | B1 * | 7/2002 | Purpura ........................ 711/164 |
| 6,760,758 | B1 * | 7/2004 | Lund et al. .................... 709/217 |
| 6,876,643 | B1 | 4/2005 | Aggarwal et al. |
| 7,392,387 | B2 | 6/2008 | Balfanz et al. |

(Continued)

FOREIGN PATENT DOCUMENTS

| CN | 1473310 A | 2/2004 |
| EP | 1802155 A1 | 6/2007 |

(Continued)

OTHER PUBLICATIONS

Barisch, Marc. "Design and evaluation of an architecture for ubiquitous user authentication based on identity management systems." Trust, Security and Privacy in Computing and Communications (TrustCom), 2011 IEEE 10th International Conference on. IEEE, 2011.*

(Continued)

*Primary Examiner* — Michael Simitoski
(74) *Attorney, Agent, or Firm* — Steven A. May; Kenneth A. Haas

(57) ABSTRACT

A system for, and method of, single sign-on collaboration among a plurality of mobile devices, includes a server for issuing a first identity token to subsequently authenticate a user of a first of the mobile devices to a service provider, and for generating and sending a collaboration credential to the first device based on the first identity token or user authentication. The first device sends the collaboration credential generated by the server to a second device paired with the first device. The server also issues a second identity token to subsequently authenticate to the service provider the user of the second device based on the collaboration credential received from the first device, to support single sign-on collaboration for the user across the plurality of mobile devices.

21 Claims, 3 Drawing Sheets

(56) References Cited

U.S. PATENT DOCUMENTS

| | | | |
|---|---|---|---|
| 7,716,483 B2 | 5/2010 | Sozzani et al. | |
| 7,788,711 B1* | 8/2010 | Sun et al. | 726/8 |
| 7,925,022 B2 | 4/2011 | Jung et al. | |
| 8,041,339 B2 | 10/2011 | Teunissen et al. | |
| 8,090,945 B2 | 1/2012 | Singhal | |
| 8,141,134 B2 | 3/2012 | Brandt et al. | |
| 8,161,172 B2 | 4/2012 | Reisman | |
| 8,201,231 B2 | 6/2012 | Williams et al. | |
| 8,205,247 B2 | 6/2012 | Lexcellent et al. | |
| 8,220,035 B1 | 7/2012 | Pravetz et al. | |
| 8,327,427 B2 | 12/2012 | Soukup et al. | |
| 2001/0041531 A1 | 11/2001 | Haight et al. | |
| 2003/0026433 A1 | 2/2003 | Matt | |
| 2003/0105981 A1* | 6/2003 | Miller et al. | 713/202 |
| 2003/0159072 A1 | 8/2003 | Bellinger et al. | |
| 2004/0097217 A1 | 5/2004 | McClain | |
| 2005/0198204 A1 | 9/2005 | Takahashi | |
| 2005/0221813 A1 | 10/2005 | Rajahalme et al. | |
| 2005/0266826 A1 | 12/2005 | Vlad | |
| 2006/0075230 A1* | 4/2006 | Baird et al. | 713/168 |
| 2006/0083208 A1 | 4/2006 | Lin | |
| 2006/0185004 A1* | 8/2006 | Song et al. | 726/8 |
| 2006/0293028 A1 | 12/2006 | Gadamsetty et al. | |
| 2007/0016943 A1* | 1/2007 | M'Raihi et al. | 726/9 |
| 2007/0019616 A1 | 1/2007 | Rantapuska et al. | |
| 2007/0022301 A1 | 1/2007 | Nicholson et al. | |
| 2007/0194931 A1 | 8/2007 | Miller et al. | |
| 2007/0202807 A1 | 8/2007 | Kim | |
| 2007/0203850 A1 | 8/2007 | Singh et al. | |
| 2007/0236586 A1 | 10/2007 | Ryckman | |
| 2007/0254709 A1 | 11/2007 | Higgins | |
| 2007/0264976 A1 | 11/2007 | Lessing et al. | |
| 2008/0083708 A1 | 4/2008 | Hussary et al. | |
| 2008/0120711 A1 | 5/2008 | Dispensa | |
| 2008/0172341 A1 | 7/2008 | Crandell | |
| 2008/0222711 A1 | 9/2008 | Michaelis | |
| 2008/0268776 A1 | 10/2008 | Amendola | |
| 2008/0278329 A1 | 11/2008 | Kim et al. | |
| 2008/0320190 A1 | 12/2008 | Lydon et al. | |
| 2008/0320587 A1 | 12/2008 | Vauclair et al. | |
| 2009/0070472 A1 | 3/2009 | Baldus et al. | |
| 2009/0083378 A1 | 3/2009 | Lingafelt et al. | |
| 2009/0202079 A1 | 8/2009 | Puputti et al. | |
| 2009/0217367 A1* | 8/2009 | Norman et al. | 726/8 |
| 2009/0249478 A1 | 10/2009 | Rosener et al. | |
| 2009/0287922 A1 | 11/2009 | Herwono et al. | |
| 2010/0005294 A1 | 1/2010 | Kostiainen et al. | |
| 2010/0088390 A1 | 4/2010 | Bai et al. | |
| 2010/0145860 A1 | 6/2010 | Pelegero | |
| 2011/0028091 A1 | 2/2011 | Higgins et al. | |
| 2011/0028125 A1 | 2/2011 | Dehlinger et al. | |
| 2011/0030044 A1 | 2/2011 | Kranendonk et al. | |
| 2011/0136470 A1 | 6/2011 | Kurz | |
| 2011/0167126 A1 | 7/2011 | Yim et al. | |
| 2011/0212688 A1 | 9/2011 | Griffin et al. | |
| 2011/0238995 A1 | 9/2011 | Blanco et al. | |
| 2011/0282960 A1 | 11/2011 | Lin | |
| 2012/0072503 A1 | 3/2012 | Kowalewski | |
| 2012/0084364 A1 | 4/2012 | Sivavakeesar | |
| 2012/0084565 A1 | 4/2012 | Wittenberg et al. | |
| 2012/0117626 A1 | 5/2012 | Yates et al. | |
| 2012/0144202 A1 | 6/2012 | Counterman | |
| 2012/0179789 A1 | 7/2012 | Griot et al. | |
| 2012/0210413 A1* | 8/2012 | Akula et al. | 726/8 |
| 2012/0216267 A1* | 8/2012 | Austel et al. | 726/8 |
| 2012/0239936 A1* | 9/2012 | Holtmanns et al. | 713/176 |
| 2013/0018975 A1 | 1/2013 | Higgins | |
| 2013/0081126 A1* | 3/2013 | Soukup et al. | 726/8 |

FOREIGN PATENT DOCUMENTS

| | | | |
|---|---|---|---|
| EP | 2068597 A1 | 6/2009 | |
| EP | 2456245 A1 | 5/2012 | |
| GB | 2365699 A | 2/2002 | |
| GB | 2478653 A | 9/2011 | |
| WO | 0221429 A2 | 3/2002 | |
| WO | 2005119931 A1 | 12/2005 | |
| WO | 2006027725 A1 | 3/2006 | |
| WO | 2006067281 A1 | 6/2006 | |
| WO | 2007107708 A2 | 9/2007 | |
| WO | 2009044228 A2 | 4/2009 | |
| WO | 2009058494 A1 | 5/2009 | |
| WO | 2009066212 A1 | 5/2009 | |
| WO | 2009070430 A2 | 6/2009 | |
| WO | 2009095048 A1 | 8/2009 | |
| WO | 2009104131 A1 | 8/2009 | |
| WO | 2009133419 A1 | 11/2009 | |
| WO | 2009140170 A1 | 11/2009 | |
| WO | 2011062726 A1 | 5/2011 | |

OTHER PUBLICATIONS

Cabarcos, Patricia Arias, et al. "Multi-device Single Sign-on for cloud service continuity." Consumer Electronics (ICCE), 2012 IEEE International Conference on. IEEE, 2012.*

Cabarcos, Patricia Arias, et al. "SuSSo: seamless and ubiquitous single sign-on for cloud service continuity across devices." Consumer Electronics, IEEE Transactions on 58.4 (2012): 1425-1433.*

Chandershekarapuram, Appadodharana, et al. "Architecture framework for device single sign on in personal area networks." On the Move to Meaningful Internet Systems 2006: OTM 2006 Workshops. Springer Berlin Heidelberg, 2006.*

Sánchez, Rosa, et al. "Enhancing privacy and dynamic federation in IdM for consumer cloud computing." Consumer Electronics, IEEE Transactions on 58.1 (2012): 95-103.*

"BUMP (application)" accessed at wikipedia.com on Jan. 24, 2012, last modified on Jan. 17, 2013.

Madsen, P., "Liberty ID-WSF Multi-Device SSO Deployment Guide," Version: 1.0-02, Liberty Alliance Project, pp. 1-13.

Farrell, S. et al., "An Internet Attribute Certificate Profile for Authorization," Network Working Group, RFC 3281, pp. 1-41, Apr. 2002.

Housley, R. et al., "Internet X.509 Public Key Infrastructure Certificate and Certificate Revocation List (CRL) Profile," Network Working Group, RFC 3280, pp. 1-130, Apr. 2002.

"Otway-Rees protocol," accessed at http://en.wikipedia.org/wiki/Otway%E2%80%93Rees_protocol, accessed on Jan. 24, 2012.

"SAML V2.0 Holder-of-Key Web Browser SSO Profile Version 1.0," accessed at http://docs.oasis-open.org/security/saml/Post2.0/sstc-saml-holder-of-key-browser-sso.pdf, Aug. 10, 2010, pp. 24.

"Bradley, J. et al.,""The OAuth 2.0 Authorization Framework: Holder-of-the-Key Token Usagedraft-tschofenig-oauth-hotk-01. txt,""Network Working Group, Internet-Draft, pp. 23, Jul. 16, 2012".

International Search Report and Written Opinion for related counterpart International Application No. PCT/US2010/042825 mailed on Oct. 22, 2010.

Sharmila et al., "Bluetooth Man-In-The-Middle Attack Based on Secure Simple Pairing using Out of Band Association model," International Conference on Control, Automation, Communication and Energy Conservation, 2009, Jun. 4-6, 2009, IEEE, pp. 1-6.

International Preliminary Report on Patentability and Written Opinion for related counterpart International application No. PCT/US2010/042825 dated Feb. 7, 2012.

International Search Report and Written Opinion for related counterpart International Application No. PCT/US2010/061217 mailed on Jun. 27, 2011.

International Preliminary Report on Patentability and Written Opinion for related counterpart International application No. PCT/US2010/061217 dated Oct. 2, 2012.

Non Final Office Action mailed Oct. 4, 2012 in related U.S. Appl. No. 12/748,982 Alejandro G. Blanco, filed Mar. 29, 2010.

Non Final Office Action mailed Apr. 9, 2012 in related U.S. Appl. No. 12/534,246, Robert J. Higgins, filed Aug. 3, 2009.

Final Office Action mailed Sep. 13, 2012 in related U.S. Appl. No. 12/534,246, Robert J. Higgins, filed Aug. 3, 2009.

Final Office Action mailed on Apr. 24, 2013 in U.S. Appl. No. 12/748,982, Alejandro G Blanco, filed Mar. 29, 2010.

International Search Report for International Patent Application No. PCT/US2012/046014 mailed on Oct. 11, 2012.

(56) References Cited

OTHER PUBLICATIONS

Non Final Office Action mailed on Jun. 24, 2013 in related U.S. Appl. No. 13/183,930, Robert J Higgins, filed Jul. 15, 2011.
Tuecke, S., et al., "Internet X.509 Public Key Infrastructure (PKI) Proxy Certificate Profile," Network Working Group, RFC 3820, Jun. 2004, pp. 1-37.
Final Office Action mailed Oct. 16, 2013 in U.S. Appl. No. 13/183,930, Robert J. Higgins, filed Jul. 15, 2011.
Office Action for European Patent Application No. 10738091.7 mailed Nov. 6, 2013.
Novotny L and Hecht B., "Principles of Nano-Optics: Theoretical foundations," Cambridge University Press, Chapter 2, 2006, pp. 13-44.
Notice of Allowance mailed Dec. 23, 2013 in U.S. Appl. No. 12/748,982, Alejandro G. Blanco, filed Mar. 29, 2010.
Jeffrey Fischer. "NFC in cell phones: The new paradigm for an interactive world". Communications Magazine, IEEE, vol. 47, No. 6, pp. 22-28, Jun. 2009.
Australian Patent Examination Report No. 1 issued on Jul. 1, 2013 in Australian Patent Application No. 2010281501.
Australian Patent Examination Report No. 2 issued on Aug. 23, 2013 in Australian Patent Application No. 2010281501.
Canadian Office Action mailed on Sep. 27, 2013 in Canadian Patent Application No. 2769331.
Chinese Office Action issued on Dec. 10, 2013 in Chinese Patent Application No. 201080034505.x.
"Performance of RFID Tags in Near and Far Field", Flores, etc., Personal Wireless Communications, 2005. ICPWC 2005 IEEE International Conference on, Jan. 23-25, 2005, pp. 353-357.
Lishoy Francis, Gerhard Hancke, Keith Mayes, and Konstantinos Markantonakis. "Practical NFC Peer-to-Peer Relay Attackv Using Mobile Phones" In "RFI DSec'1 0 Proceedings of the 6th international conference on Radio frequency identification:security and privacy issues". Istanbul, Turkey, Jun. 8-9, 2010. pp. 35-49.
Yih-chun Hu, Adrian Perrig, and David B. Johnson. "Wormhole attacks in wireless networks". In "IEEE Journal on Selected Areas in Communications" vol. 24. Published 2006 (month unknown). pp. 370-380.
Non Final Office Action mailed on Apr. 22, 2014 in related U.S. Appl. No. 13/183,930, Robert J Higgins, filed Jul. 15, 2011.
Notice of Allowance mailed Apr. 14, 2014 in U.S. Appl. No. 12/748,982, Alejandro G Blanco, filed Mar. 29, 2010.
Assertions and Protocols for the Oasis Security Assertion Markup Language (SAML) V2.0; Oasis Standard, March 15, 2005; 86 Pages; Editors Scott Cantor, et al.
PCT International Search Report Dated Mar. 14, 2014 for Counterpart Application PCT/US2013/071850.
Hocking C.G., et al. "A Distributed and Cooperative User Authentication Framework", Information Assurance and Security (IAS), 2010 Sixth International Confeence on, IEEE, Aug. 23, 2010, p. 304-310, XP031777197, ISBN:978-1-4244-7407-3.
Marc Barish "Design and Evaluation of an Architecture for Ubiquitous User Authentication Based on Identity Management Systems", Trust, Security and Privacy in Computing and Communicatiions (TrustCom), 2011 IEEE 10th International Conference on, Nov. 16, 2011, pp. 863-872, XP032086891, D01:10.1109/Trustcom.2011.116, ISBN:978-1-4577-2135-9.

* cited by examiner

METHOD AND APPARATUS FOR SINGLE SIGN-ON COLLABORATION AMONG MOBILE DEVICES

REFERENCE TO RELATED APPLICATIONS

The present application is related to U.S. patent application Ser. No. 13/728,598, entitled "Method of and System for Authenticating and Operating Personal Communication Devices over Public Safety Networks"; U.S. patent application Ser. No. 13/728,521, entitled "Method and Apparatus for Single Sign-On Collaboration Among Mobile Devices"; U.S. patent application Ser. No. 13/728,711, entitled "Method and Apparatus for Ensuring Collaboration Between a Narrowband Device and a Broadband Device"; U.S. patent application Ser. No. 13/728,752, entitled "System and Method for Scoping a User Identity Assertion to Collaborative Devices"; and U.S. patent application Ser. No. 13/728,797, entitled "Apparatus for and Method of Multi-Factor Authentication Among Collaborating Mobile Devices"; which applications are commonly owned and filed on the same date as this application and the contents of which applications are incorporated herein in their entirety by reference thereto.

FIELD OF THE DISCLOSURE

The present disclosure relates generally to a system for, and a method of, single sign-on (SSO) collaboration among a plurality of mobile devices.

BACKGROUND

Single sign-on (SSO) technology is a session/user authentication process that permits an on-line user to enter identity information, for example, a user name and a password, in response to prompts in order to access multiple applications, e.g., email, banking services, shopping services, etc., at various web sites or internet domains hosted by a service provider, on a single mobile device. The SSO process authenticates the user for all the applications that he or she has been given rights to, and eliminates further prompts when the user switches applications during a particular on-line session. Security Assertion Markup Language (SAML) and Web Authorization Protocol (OAuth) are examples of open standards for exchanging authentication and authorization data between such multiple applications on a single mobile device.

As advantageous as the known SSO processes have been, they do not support SSO when a user of one mobile device changes or switches to another mobile device. By way of example, a user may be checking his or her email on a personal digital assistant or a smartphone, and then, for whatever reason, may subsequently wish to check his or her email, or even run a different application, on his or her laptop computer or a desktop computer. Thereafter, the user may wish to check his or her email, or even run a different application, on his or her tablet. The user may, in case of emergency, subsequently wish to run an application on his or her land mobile radio (LMR). At present, whenever the user changes mobile devices, he or she must re-enter the identity information, for example, the user name and password, in response to prompts made by each new mobile device.

Accordingly, there is a need to enable SSO across a plurality of mobile devices to reduce the amount of time and the annoyance of having to log in and enter the identity information each and every time that the user changes devices.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
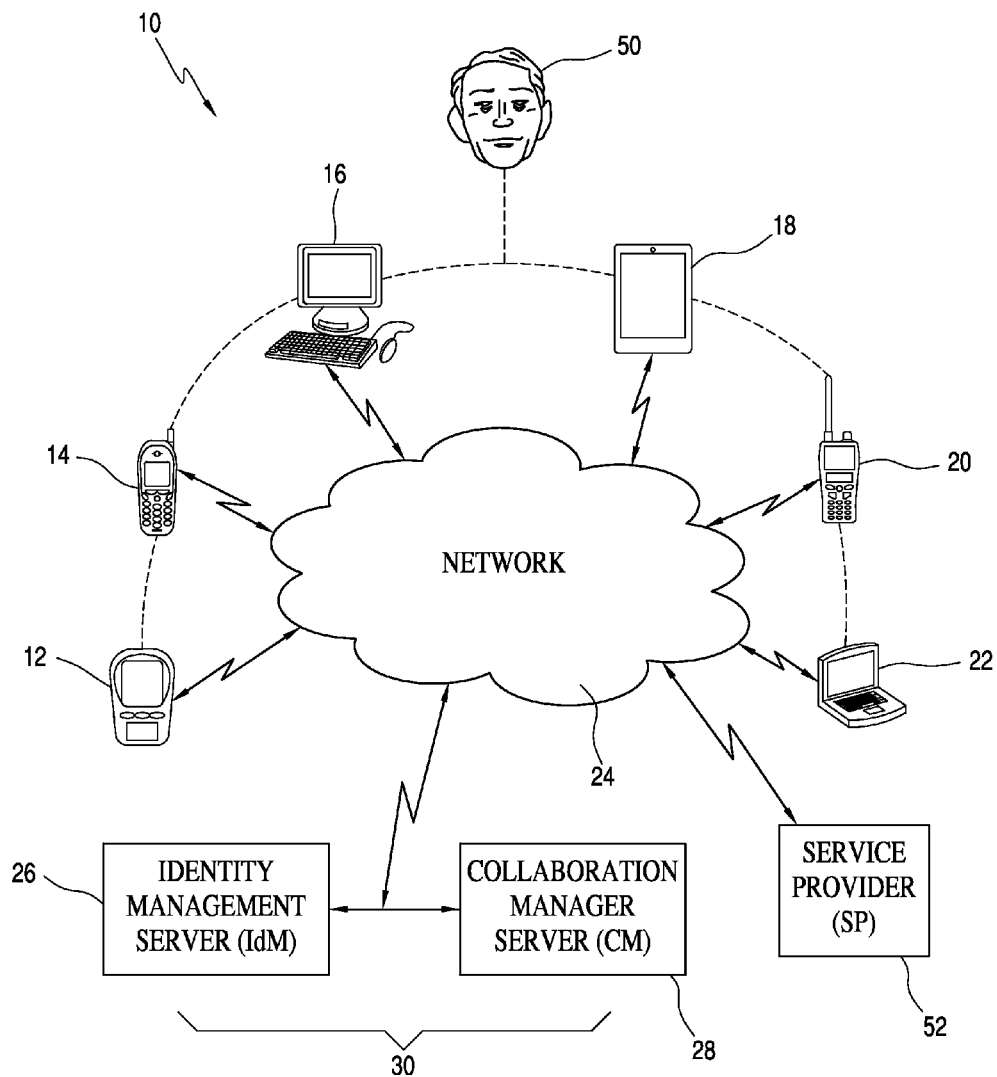
FIG. 1 is a schematic view of a system for single sign-on (SSO) collaboration among a plurality of mobile devices in accordance with the present disclosure

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a system for single sign-on collaboration among a plurality of mobile devices. The term "collaboration" or "SSO collaboration" refers to a type of working cooperation among mobile devices, whereby a user can sign-on, or login, to a first service from a first mobile device, and leverage a set of enhanced identity management procedures to securely access the first service, as well as other services, from the first mobile device, as well as from other mobile devices, without needing to perform additional manual sign-on procedures.

The system includes a server operative for issuing a first identity token (as defined below) to subsequently authenticate a user of a first of the mobile devices to a service provider, and for generating and sending a collaboration credential to the first mobile device based on the first identity token and/or user authentication. The first mobile device is operative for sending the collaboration credential generated by the server to a second mobile device paired with the first mobile device. The server is further operative for issuing a second identity token (as defined below) to subsequently authenticate the user of the second mobile device to the service provider based on the collaboration credential received from the first mobile device, to support single sign-on collaboration for the user across the plurality of mobile devices. The collaboration credential can be generated first, and then used by either mobile device to request a respective identity token.

Advantageously, the server configures the collaboration credential as a data structure that comprises at least one of an identification of the user, an identification of the first mobile device, an identification of which of the plurality of mobile devices are permitted to collaborate with the first mobile device, and an identification of the conditions under which the collaboration is permitted to be conducted. In one embodiment, the collaboration credential is concatenated with a message authentication data structure, such as a keyed hash, also known as a message authentication code (MAC), or a digital signature. In another embodiment, the collaboration credential is encrypted with a key known only to the server.

The server also configures each identity token as a data structure that comprises at least one of an identification of the user and an identification of the mobile device to which the respective identity token is sent. As used herein, the term "data structure" includes a list, string, array, or any complex data structure that includes files or data sets. When the data structure of the collaboration credential is a file, then the file format may be JavaScript Object Notation (JSON), XML, HTML, ASCII, Binary, or any other file format, and the file may be compressed or encrypted, in part or in whole. Computing and concatenating a MAC to a data structure is herein referred to as "MACing".

The server can constitute a single identity management server for issuing each identity token and for generating and verifying the collaboration credential. In a variant construction, the server can constitute an identity management server for issuing each identity token, and a collaboration manager server for generating and verifying the collaboration credential.

A method, in accordance with another aspect of this disclosure, of single sign-on collaboration among a plurality of mobile devices, is performed by issuing and sending a first identity token to a first of the mobile devices to subsequently authenticate a user of the first mobile device to a service provider, generating and sending a collaboration credential to the first mobile device based on the first identity token and/or user authentication, pairing the first mobile device with a second mobile device, sending the collaboration credential to the second mobile device, requesting a second identity token based on the collaboration credential, and issuing and sending a second identity token to the second mobile device to subsequently authenticate the user of the second mobile device to the service provider, for supporting single sign-on collaboration for the user across the plurality of mobile devices.

Turning now to the drawings, reference numeral 10 in FIG. 1 generally identifies a system for single sign-on collaboration for a user 50 among a plurality of his or her mobile devices, such as, by way of non-limiting example, a personal digital assistant 12, a smartphone 14, a desktop computer 16, a tablet 18, a land mobile radio (LMR) 20, and a laptop computer 22. Other mobile devices, and other device types, that are different from those illustrated are also contemplated by the present disclosure. Each of these mobile devices has one or more network interfaces, which may include one or more radio frequency (RF) transceivers operatively connected to a network 24, for example, the Internet, preferably over a bi-directional wireless link, such as Wi-Fi, which is an open wireless standard for transmission of digital voice and data. The network 24 need not be a single network as illustrated, but could comprise a plurality of networks interconnected by forwarding equipment. The mobile devices 12, 14, 16, 18, 20 and 22 not only communicate over the network 24 with a service provider (SP) 52, but can also wirelessly communicate with one another, for example, via Bluetooth®, which is another open wireless standard for transmission of digital voice and data between devices.

In one embodiment, all of the user's mobile devices 12, 14, 16, 18, 20 and 22 can communicate directly with each other. In another embodiment, some of the user's mobile devices may have to communicate with each other via one or more of the user's other mobile devices. In one embodiment, all of the user's mobile devices have the same wireless interface, such as Bluetooth®. In another embodiment, some of the user's mobile devices have one wireless interface, such as Bluetooth®; others of the mobile devices have another wireless interface, such as Wi-Fi; and still others of the mobile devices have both, or other interfaces.

The system 10 includes a server 30, which comprises either a single identity management server (IdM) 26, as described below in connection with FIG. 2, or the IdM 26 in combination with a collaboration manager server (CM) 28, as described below in connection with FIG. 3. The server 30 is operatively connected to the network 24 over a bi-directional link, which may be wired or wireless, and interacts with one or more of the devices 12, 14, 16, 18, 20 and 22, as described in detail below. Each server comprises one or more processes running on one or more computers.

Each of the server 30 and the mobile devices 12, 14, 16, 18, 20 and 22 includes a processor, such as one or more microprocessors, microcontrollers, digital signal processors (DSPs), combinations thereof or such other devices known to those having ordinary skill in the art. The particular operations/functions of the processor, and respectively thus of the server and mobile devices, is determined by an execution of software instructions and routines that are stored in a respective at least one memory device associated with the processor, such as random access memory (RAM), dynamic random access memory (DRAM), and/or read only memory (ROM) or equivalents thereof, that store data and programs that may be executed by the corresponding processor. Further, in the event that the server 30 is implement as both the IdM 26 and the CM 28, each of the IdM and the CM includes a processor whose particular operations/functions, and respectively thus of the server, is determined by an execution of software instructions and routines that are stored in a respective at least one memory device associated with the processor. Unless otherwise specified herein, the functionality described herein as being performed by the server(s) and mobile devices is implemented with or in software programs and instructions stored in the respective at least one memory device of the server(s) and mobile devices and executed by the associated processor of the server(s) and mobile devices.

Turning now to the message sequence chart of FIG. 2, across the top of the chart, any one of the aforementioned mobile devices 12, 14, 16, 18, 20 and 22 is depicted, and hereinafter referred to, as device 1, and any other of the aforementioned mobile devices 12, 14, 16, 18, 20 and 22 is depicted, and hereinafter referred to, as device 2. It will be appreciated that the devices 1 and 2 may be of different types, or may be of the same type, e.g., both devices 1 and 2 may be smartphones. Also shown, across the top of the chart, is the IdM 26 and the SP 52, e.g., a host for hosting services and applications that are provided over the network 24. The timed sequence in which various actions are performed is shown as one proceeds down away from the top of the chart.

Initially, the user 50 of device 1 (box 100) is not logged into the SP 52, and the user 50 of device 2 (box 102) is not logged into the SP 52. Thereupon, the user 50 of the device 1 first establishes a secure connection or "tunnel" between the device 1 and the IdM 26 (see message 104), and then authenticates himself or herself to the IdM 26. The user 50 inputs into the device 1, and the device conveys to IdM 26, identity information, for example, a user name and a user password, and, optionally, some other data, such as what other devices or types of devices to which the user 50 wants to gain access, or the conditions under which such access is to be permitted or denied.

In one embodiment, rather than explicitly entering the other devices or device types, or the conditions under which access is to be permitted, the user 50 could instead input to the device 1, and the device conveys to IdM 26, an indication of what actions the user 50 intends to perform, or what services/applications the user 50 intends to use. In another embodiment, data, such as the devices, the types of devices, the actions or the services/applications, is not entered by the user 50, but instead, is automatically generated by the device 1 and is sent to the server 30. In response to receiving the identity information from device 1, the IdM 26 issues a first data structure (see box 106) or first identity token 1 (as defined below) and sends the first identity token 1 to the device 1 to subsequently authenticate the user 50 of the device 1 to the SP 52 (see message 108).

In one embodiment, the device 1 next requests from the IdM 26 a collaboration credential based on the first identity token 1 and/or user authentication (see message 110) and that is sharable among two or more of mobile devices 12, 14, 16, 18, 20 and 22, and more particularly between device 1 and device 2. For example, in response to receiving the first identity token 1, device 1 may convey, to the IdM 26, a collaboration request that is associated with the first identity token 1, for example, that includes the first identity token 1 or a value associated with the first identity token 1, such as a value derived from the first identity token 1, or where the collaboration request is secured by the first identity token, or transmitted over a link secured with the first identity token, or transited by a device which uses the first identity token to establish a secure communications session. This request can be performed automatically or manually. In response to receiving the request, the IdM 26 generates the collaboration credential (see box 112) as a data structure, and sends the collaboration credential to the device 1 (see message 114). In another embodiment, rather than sending the first identity token 1 and the collaboration credential as independent actions, the IdM 26 may send the collaboration credential to device 1 simultaneously with the first identity token 1, for example, in a same message, in response to authenticating the user of device 1.

In one embodiment, the collaboration credential is a Kerberos data structure or ticket containing, by way of non-limiting example, one or more of a user identification, a session identification, a collaboration device identification(s), other collaboration device description(s), an expiration time, and other usage constraints. In another embodiment, the collaboration credential is an OAuth token, a SAML token, a JSON Web Token (JWT), or another type of identity token. In one embodiment, the collaboration credential is a data structure that contains information used to bind multiple devices to a single user 50, or to bind multiple devices to a single purpose, or to bind the user 50 to a device, or to bind a device to one or more other devices, or to bind at least one device to a user group. The device 1 now knows which of the plurality of mobile devices 12, 14, 16, 18, 20 and 22 are permitted to collaborate with the device 1, and also knows the conditions under which such collaboration is permitted to be conducted.

By way of non-limiting example, the device 1 might be instructed by the collaboration credential to collaborate with only one other device, such as the user's desktop computer 16, or to only collaborate with another device for a set period of time, or to only collaborate using certain applications hosted by the SP 52, or to collaborate only with mobile devices with which it is able to perform certificate-based authentication, etc. The data contained in the collaboration credential may have been supplied by the user 50, or by the device 1, during identification/authentication as described above, or may have been entered into a database of the server 30 beforehand. In one embodiment, the data provided by the user 50 may be used in conjunction with data in the aforementioned database to determine the conditions under which collaboration is permitted.

Next, a transport layer security (TLS) session is established between the device 1 and the SP 52 (see message 116). Cryptographic protocols, other than TLS, such as Internet Protocol Security (IPsec), Secure Sockets Layer (SSL), Secure Shell (SSH), and like cryptographic protocols that provide communication security over the Internet, could also be employed. Alternatively, no cryptographic protocol between the device 1 and the SP 52 could be used. The device 1 requests service based on the first identity token 1 (see message 118). In response, the SP 52 activates the service and/or associated application and allows device 1 access to the service/application (see message 120). The user 50 is now authenticated and logged into the SP 52 (see box 122).

When collaboration with another device, that is, the device 2, is desired, the devices 1 and 2 must establish a security association between each other. When such collaborating devices form such a security association, they are said to be paired. If Bluetooth® is employed, then pairing occurs when two Bluetooth® devices agree to communicate with each other and establish a secure connection. In some cases, Bluetooth® can provide the needed security association, and in other cases a higher communication layer can provide the needed security association. In some cases, a shared secret, also sometimes referred to as a passkey or a personal identification number (PIN), is exchanged between the two devices 1 and 2. Alternatively, the devices 1 and 2 can each derive a shared secret without directly exchanging the value of the shared secret between each other, such as is provided by the well known Diffie-Hellman algorithm.

A passkey is a code shared by both devices 1 and 2, which proves that both devices have agreed to pair with each other. Once paired (see message 124), the device 1 is operative for sending the collaboration credential (see box 126) generated by the server 30 to the device 2 (see message 128). The pairing need not be performed immediately prior to the sharing of the collaboration credential, but could be performed beforehand. It will be appreciated by those skilled in the art that once a security association exists between devices, data can be sent securely between the devices using the security association.

In one embodiment the security association used for collaborative pairing is established through the use of certificate-based authentication. Where the collaborating devices exchange digital certificates, such as standard X.509 certificates, public key cryptographic methods, such as those described by the TLS standard, are used to establish the necessary security association. In one embodiment, attributes in the exchanged certificates can be used determine the applicability of SSO collaboration for the device presenting the certificate.

In one embodiment, the device 1 sends a collaboration notification (see message 125) to the server 30 to indicate that it has sent, or will send, the collaboration credential to the device 2. The collaboration notification is a message, file or data structure, which identifies the device 1 as the source of the collaboration credential, and identifies the device 2 as the recipient of the collaboration credential. The collaboration notification may further contain scoping assertions about the intended use of the collaboration credential. For example, the scoping assertions may indicate that the collaboration credential may only be used for services specifically identified in the collaboration notification. In one embodiment, the collaboration notification may be sent to the device 2 by the device 1, after which the device 2 forwards the collaboration notification to the server 30.

Next, a TLS session is established between the device 2 and the IdM 26 (see message 130). The device 2 next requests a second data structure or second identity token 2 (as defined below) based on the collaboration credential (see message 132). In response, the IdM 26 verifies the collaboration credential (see box 134), and issues and sends to device 2 the second identity token 2 (see message 136), which second identity token subsequently is used to authenticate the user of the device 2 to the SP 52. In one embodiment, when the IdM 26 verifies the collaboration credential, the IdM 26 will compare the identity of the device from which it received the collaboration credential (i.e., the device 2) with any collaboration notification received from the device 1. In one embodiment, the second identity token 2 identifies the same user 50 as the first identity token 1. The collaboration credential can be generated first, and then used by either mobile device 1 or 2 to request a respective identity token 1 or 2.

Next, a TLS session is established between the device 2 and the SP 52 (see message 138). The device 2 requests service based on the second identity token 2 and/or user authentication (see message 140). In response, the SP 52 activates the service/application and allows device 2 access to the service/application (see message 142), thereby enabling single sign-on collaboration for the user 50 across the devices 1 and 2. The user 50 is now authenticated and logged into the SP 52 (see box 144). If additional collaboration is required for an additional one of the aforementioned devices 12, 14, 16, 18, 20 and 22, then the above-described process is repeated. It will be noted that the identity tokens 1 and 2 are not shared; only the collaboration credential is passed between the devices 1 and 2.

Figure 2:
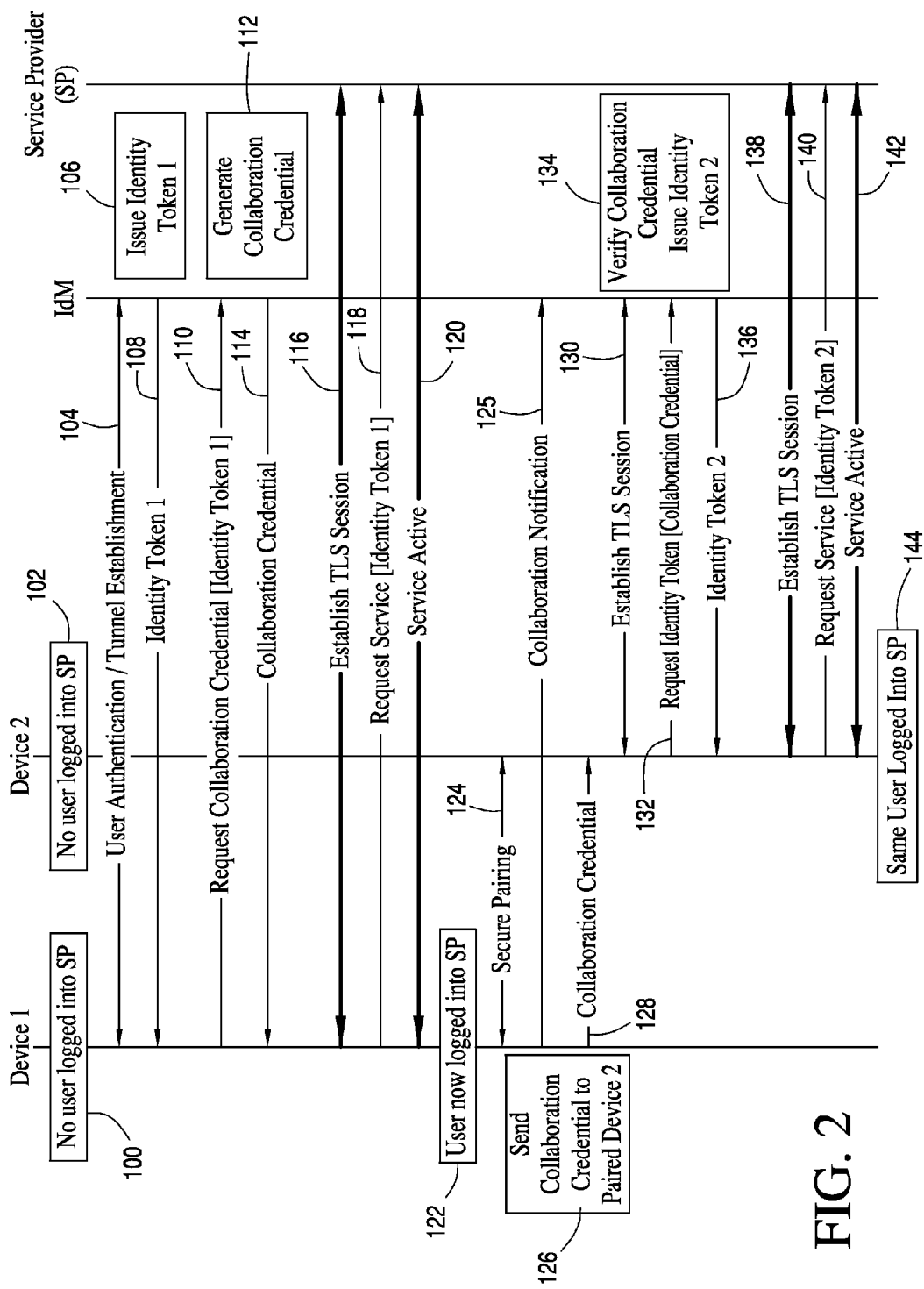
FIG. 2 is a message sequence chart depicting steps performed in a method of single sign-on (SSO) collaboration among a plurality of mobile devices in accordance with one embodiment of the present disclosure.
Figure 3:
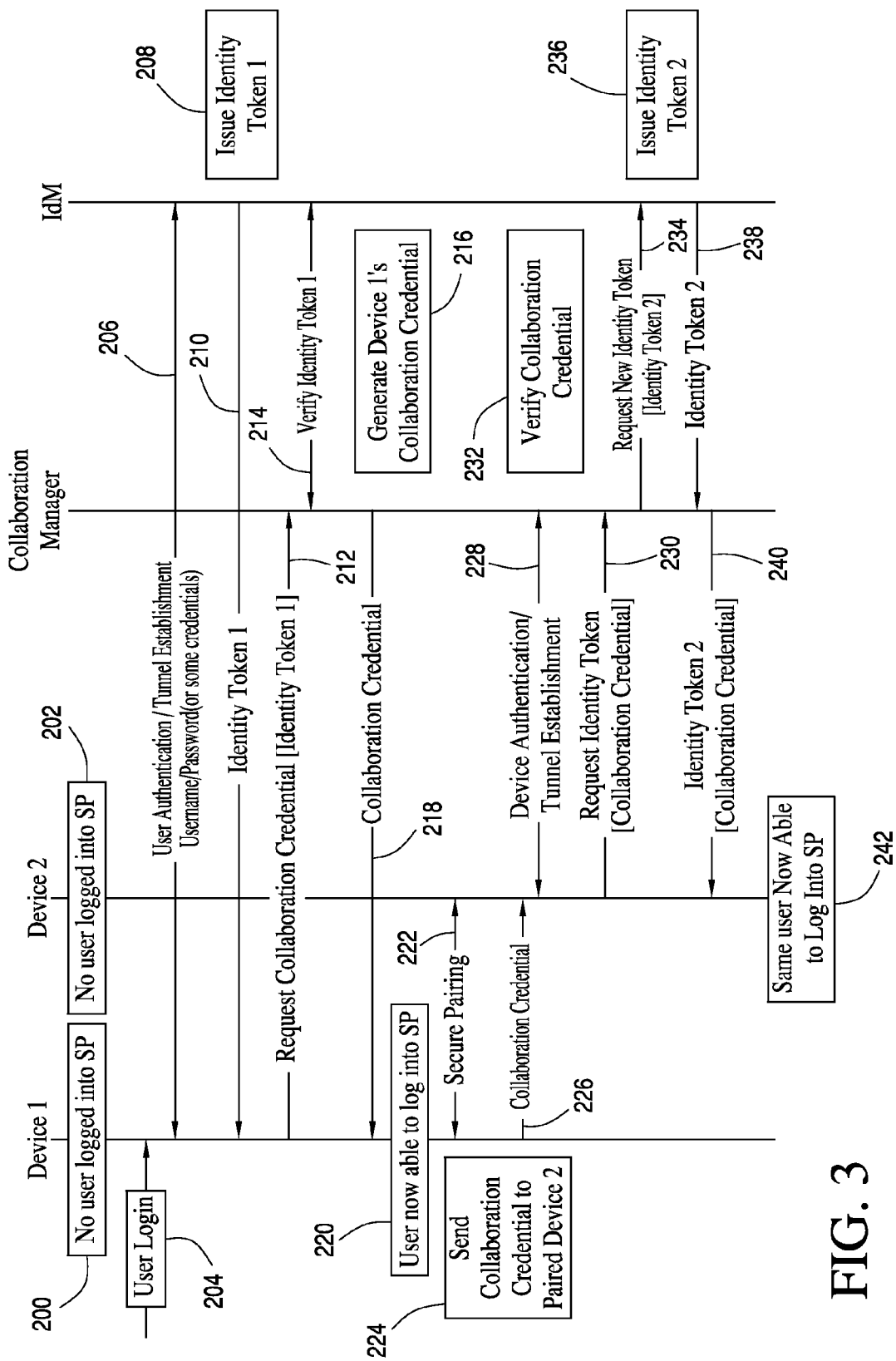
FIG. 3 is a message sequence chart depicting steps performed in a method of single sign-on (SSO) collaboration among a plurality of mobile devices in accordance with another embodiment of the present disclosure.

FIG. 3 is analogous to FIG. 2, except that the SP 52 has been omitted for ease of illustration, and, instead of the server 30 just constituting the IdM 26, the server 30 now comprises the IdM 26 and the CM 28. This embodiment allows the potential re-use of a commercial-off-the-shelf (COTS) IdM 26. In brief, the IdM 26 still issues identity tokens, as described above, but now the CM 28 generates and verifies the collaboration credential.

As shown in FIG. 3, the user 50 of device 1 (box 200) is not logged into the SP 52, and the user 50 of device 2 (box 202) is not logged into the SP 52. The user 50 then logs into the device 1 (box 204), and establishes a secure connection or "tunnel" between the device 1 and the IdM 26 as described with respect to FIG. 2. The user 50 then enters the user's identification data into device 1 and the device conveys the identification data as described with respect to FIG. 2 to the IdM 26 (see message 206). In response to receiving the identification data, the IdM 26 issues the first identity token 1 (see box 208) and sends the first identity token 1 to the device 1 (see message 210) for use in subsequently authenticating the user 50 of the device 1 to the SP 52.

The device 1 next requests, from the CM 28, the collaboration credential based on the first identity token 1 and/or user authentication (see message 212). The CM 28 verifies the first identity token 1 (see message 214) after which the CM 28 generates the collaboration credential (see box 214) and sends the collaboration credential to the device 1 (see message 218). Verifying the first identity token 1 by the CM 28 may involve performing MAC or signature verification, or may require an explicit request to the IdM 26. The user 50 is now able to log into, and be authenticated to, the SP 52 via the device 1 (see box 220).

The devices 1 and 2 are paired (see message 222), as described with respect to FIG. 2, after which the device 1 (see box 224) is operative for sending the collaboration credential to the device 2 (see message 226). Next, a secure tunnel is established between the device 2 and the CM 28 (see message 228). The device 2 next requests, from the CM 28, the second identity token 2 based on the collaboration credential (see message 230). In response, the CM 28 verifies the collaboration credential (see box 232), and sends the request for the second identity token 2 to the IdM 26 (see message 234). In response to receiving the request from the CM, the IdM 26 issues the second identity token 2 (see box 236) and sends the second identity token 2 to the CM 28 (see message 238), which, in turn, sends the second identity token 2 to the device 2 (see message 240) for use in subsequently authenticating the user 50 of the device 2 to the SP 52. The same user 50 is now able to be logged into, and be authenticated to, the SP 52 via the device 2 (see box 242).

In a preferred embodiment, rather than having the device 2 request the second identity token 2 from the CM 28, the device 2 can directly request the identity token 2 from the IdM 26. Also, rather than having the IdM 26 send the second identity token 2 to the CM 28, the IdM 26 can directly send the second identity token 2 to the device 2. Further, in the preferred embodiment, the identity token is an OAuth token, and the collaboration credential is an OAuth Request with a grant type equal to a SAML assertion or a JWT assertion.

As described so far, the collaboration credential is the same for all the devices. It is also contemplated that different collaboration credentials could be used for different sets of the devices. For example, one collaboration credential can be used by the device 1 to enable SSO collaboration with other devices, and a separate collaboration credential can be used by device 2 to collaborate with other devices. Alternatively, one collaboration credential may be constrained to a specific application, a set of applications, a device type, a device assurance level, a collaborative network type (personal area network, vehicular area network, etc.), or to any other device, user, or network attribute. The collaboration credential can be generated first, and then used by either mobile device to request a respective identity token.

Throughout this specification, the term "identity token" is used to refer to a syntactical structure that communicates information about the user 50. Types of information often communicated within an identity token include: a unique identifier for the user 50, a unique identifier of the server 30 which issued the identity token, an expiration time after which the identity token may no longer be used, the time at which the identity token was issued, and a primary authentication context reference specifying the time at which the user authenticated themselves in order to obtain the identity token and the method of authentication they used (passwords and RSA passcodes are two examples).

Identity tokens may also contain other relevant attributes about the user 50, such as his or her agency of employment, roles within his or her agency, special skills, or identifying facial attributes. This list is meant to be exemplary of a typical identity token, and non-binding, as many other attributes might be included as well. Identity tokens may be either digitally signed by the token issuer, or may alternatively require a secure connection between the consumer of the identity token (often referred to as the relying party, service provider, or resource server) and the identity token issuer.

Identity tokens are also known by other names within industry and standards. In the SAML 2.0 protocol, identity tokens may be referred to as SAML assertions, or simply, identity assertions. In OAuth, identity tokens are referred to as access tokens, and in OpenID Connect, identity tokens may be referred to as id tokens. Other identity tokens are intended for usage strictly between the user and the token issuing server, and these are often referred to as session tokens. In OAuth, a refresh token could be thought of as but one example of a session token.

In the foregoing specification, specific embodiments have been described. However, one of ordinary skill in the art appreciates that various modifications and changes can be made without departing from the scope of the invention as set forth in the claims below. For example, although the TLS protocol has been described and illustrated herein, other cryptographic protocols, such as Internet Protocol Security (IPsec), Secure Sockets Layer (SSL), Secure Shell (SSH), and like cryptographic protocols that provide communication security over the Internet, could be employed. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or system that comprises, has, includes, contains a list of elements does not include only those elements, but may include other elements not expressly listed or inherent to such process, method, article, or system. An element proceeded by "comprises . . . a," "has . . . a," "includes . . . a," or "contains . . . a," does not, without more constraints, preclude the existence of additional identical elements in the process, method, article, or system that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for enabling a user of a first mobile device to extend user authentication credentials to a second mobile device, the apparatus comprising:
a server having a processor that is configured to:
issue and send a first identity token to the first mobile device, wherein the first identity token can be utilized to authenticate the user of the first mobile device to a service provider;
generate a collaboration credential, wherein generation of the collaboration credential is based on one or more of user authentication and receipt of a collaboration request associated with the first identity token and wherein the collaboration credential is sharable among a plurality of mobile devices;
send the collaboration credential to the first mobile device;
receive the collaboration credential from the second mobile device;
verify the collaboration credential received from the second mobile device; and
in response to verifying the collaboration credential received from the second mobile device, issue and send a second identity token to the second mobile device, wherein the second identity token can be utilized to authenticate the second mobile device to the service provider;
the processor further is configured to receive, from the first mobile device a collaboration notification that identifies the first mobile device as a source of the collaboration credential and identifies the second mobile device as a recipient of the collaboration credential.

2. The apparatus of claim 1, wherein the processor is configured to receive the collaboration request from the first mobile device and wherein the processor is configured to generate the collaboration credential in response to receiving the collaboration request.

3. The apparatus of claim 1, further comprising the first mobile device, wherein the first mobile device is configured to:
receive the first identity token and the collaboration credential from the server; and
send the collaboration credential to the second mobile device.

4. The apparatus of claim 3, further comprising the second mobile device, wherein the second mobile device is configured to:
receive the collaboration credential from the first mobile device;
send the collaboration credential to the server; and
in response to sending the collaboration credential, receive the second identity token.

5. The apparatus of claim 1, wherein the processor further is configured to receive the collaboration credential from a third mobile device and, in response to receiving the collaboration credential from the third mobile device, issue and send a third identity token to the third mobile device, wherein the third identity token can be utilized to authenticate the user of the third mobile device to the service provider.

6. The apparatus of claim 1, wherein the processor further is configured to configure the collaboration credential as a data structure comprising at least one of an identification of the user, an identification of the first mobile device, an identification of which of a plurality of mobile devices are permitted to collaborate with the first mobile device, and an identification of the conditions under which the collaboration is permitted to be conducted.

7. The apparatus of claim 1, wherein the processor further is configured to configure each identity token as a data structure comprising at least one of an identification of the user and an identification of the mobile device to which the respective identity token is sent.

8. The apparatus of claim 1, wherein the server comprises an identity management server that is configured to issue each identity token and generate and verify the collaboration credential.

9. The apparatus of claim 1, wherein the server comprises:
an identity management server that is configured to issue each identity token; and
a collaboration manager server that is configured to generate and verify the collaboration credential.

10. A method for enabling a user of a first mobile device to extend user authentication credentials to a second mobile device, the method comprising:
issuing and sending a first identity token to the first mobile device, wherein the first identity token can be utilized to authenticate the user of the first mobile device to a service provider;
generating a collaboration credential, wherein generation of the collaboration credential is based on one or more of user authentication and receipt of a collaboration request associated with the first identity token and wherein the collaboration credential is sharable among a plurality of mobile devices;
sending the collaboration credential to the first mobile device;

receiving the collaboration credential from the second mobile device;
verifying the collaboration credential received from the second mobile device; and
in response to verifying the collaboration credential received from the second mobile device, issuing and sending a second identity token to the second mobile device, wherein the second identity token can be utilized to authenticate the second mobile device to the service provider;
further comprising receiving a collaboration notification that identifies the first mobile device as a source of the collaboration credential and identifies the second mobile device as a recipient of the collaboration credential.

11. The method of claim 10, wherein the method further comprises receiving the collaboration request from the first mobile device and wherein generating the collaboration credential comprises generating the collaboration credential in response to receiving the collaboration request.

12. The method of claim 10, further comprising:
receiving, by the first mobile device, the first identity token and the collaboration credential from the server; and
sending, by the first mobile device, the collaboration credential to the second mobile device.

13. The method of claim 12, further comprising:
receiving, by the second mobile device, the collaboration credential from the first mobile device;
sending, by the second mobile device to the server, the collaboration credential; and
in response to sending the collaboration credential, receiving, by the second mobile device, the second identity token.

14. The method of claim 10, further comprising:
receiving the collaboration credential from the third mobile device; and
in response to receiving the collaboration credential from the third mobile device, issuing and sending a third identity token to the third mobile device, wherein the third identity token can be utilized to authenticate the user of the third mobile device to the service provider.

15. The method of claim 10, further comprising configuring the collaboration credential as a data structure comprising at least one of an identification of the user, an identification of the first mobile device, an identification of which of a plurality of mobile devices are permitted to collaborate with the first mobile device, and an identification of the conditions under which the collaboration is permitted to be conducted.

16. The method of claim 10, further comprising configuring each identity token as a data structure comprising at least one of an identification of the user and an identification of the mobile device to which the respective identity token is sent.

17. An apparatus for enabling single sign-on collaboration among a plurality of mobile devices, the apparatus comprising:
a mobile device comprising a processor that is configured to:
receive each of a first identity token and a collaboration credential from a server, wherein the first identity token can be utilized to authenticate a user of the mobile device to a service provider and wherein the collaboration credential is sharable among a plurality of mobile devices and is configured to enable each mobile device of the plurality of mobile devices to obtain an identity token; and
send the collaboration credential to another mobile device;

wherein the processor further is configured to, send a collaboration notification to the server, wherein the collaboration notification identifies the mobile device as a source of the collaboration credential and identifies the another mobile device as a recipient of the collaboration credential.

18. The apparatus of claim 17, wherein the processor is configured to receive the collaboration credential by sending a collaboration request to the server, wherein the collaboration request is associated with the first identity token, and, in response to sending the collaboration request, receive the collaboration credential.

19. The apparatus of claim 17, wherein the mobile device is a first mobile device and wherein the apparatus further comprises a second mobile device that is configured to:
- receive the collaboration credential from the first mobile device;
- send the collaboration credential to the server; and
- in response to sending the collaboration credential, receive the second identity token from the server, wherein the second identity token can be utilized to authenticate the user of the second mobile device to the service provider.

20. A method for enabling single sign-on collaboration among a plurality of mobile devices, the method comprising:
- receiving, by a mobile device of the plurality of communication devices, each of a first identity token and a collaboration credential from a server, wherein the first identity token can be utilized to authenticate a user of the mobile device to a service provider and wherein the collaboration credential is sharable among a plurality of mobile devices and is configured to enable each mobile device of the plurality of mobile devices to obtain an identity token; and
- sending, by the mobile device, the collaboration credential to another mobile device of the plurality of mobile devices;
- wherein the method further comprises sending a collaboration notification to the server, wherein the collaboration notification identifies the mobile device as a source of the collaboration credential and identifies the another mobile device as a recipient of the collaboration credential.

21. The method of claim 20, wherein receiving the collaboration credential comprises:
- sending a collaboration request to the server, wherein the collaboration request is associated with the first identity token; and
- in response to sending the collaboration request, receiving the collaboration credential.

* * * * *

UNITED STATES PATENT AND TRADEMARK OFFICE
CERTIFICATE OF CORRECTION

| | |
|---|---|
| PATENT NO. | : 8,782,766 B1 |
| APPLICATION NO. | : 13/728422 |
| DATED | : July 15, 2014 |
| INVENTOR(S) | : Anthony R. Metke et al. |

It is certified that error appears in the above-identified patent and that said Letters Patent is hereby corrected as shown below:

IN THE TITLE PAGE:

In Item (56), under "OTHER PUBLICATIONS," in Column 2, Lines 1-5, delete "Barisch, Marc. "Design and evaluation of an architecture for ubiquitous user authentication based on identity management systems." Trust, Security and Privacy in Computing and Communications (TrustCom), 2011 IEEE 10th International Conference on. IEEE, 2011.".

On Page 3, in Item (56), under "OTHER PUBLICATIONS," in Column 2, Line 2, delete "Attackv" and insert -- Attack --, therefor.

On Page 3, in Item (56), under "OTHER PUBLICATIONS," in Column 2, Line 21, delete "Confeence" and insert -- Conference --, therefor.

On Page 3, in Item (56), under "OTHER PUBLICATIONS," in Column 2, Line 23, delete "Marc Barish" and insert -- Marc Barisch --, therefor.

On Page 3, in Item (56), under "OTHER PUBLICATIONS," in Column 2, Line 25, delete "Communicatiions" and insert -- Communications --, therefor.

IN THE SPECIFICATION:

In Column 2, Line 8, delete "disclosure" and insert -- disclosure. --, therefor.

Signed and Sealed this
Twelfth Day of July, 2016

Michelle K. Lee
*Director of the United States Patent and Trademark Office*